US012657954B2

(12) United States Patent
Saito

(10) Patent No.: US 12,657,954 B2
(45) Date of Patent: Jun. 16, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Sho Saito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 18/064,632

(22) Filed: Dec. 12, 2022

(65) Prior Publication Data

US 2023/0222833 A1 Jul. 13, 2023

(30) Foreign Application Priority Data

Jan. 11, 2022 (JP) ................................. 2022-002499

(51) Int. Cl.
*G06V 40/16* (2022.01)
*G06T 7/246* (2017.01)
(Continued)

(52) U.S. Cl.
CPC ............ *G06V 40/167* (2022.01); *G06T 7/246* (2017.01); *G06V 10/26* (2022.01); *G06V 40/172* (2022.01);
(Continued)

(58) Field of Classification Search
CPC .... G06V 40/167; G06V 40/172; G06V 40/20; G06V 40/10; G06V 10/26; G06V 10/62;
(Continued)

(56) References Cited

U.S. PATENT DOCUMENTS

2013/0329958 A1* 12/2013 Oami ................... G06V 40/103
382/103
2014/0347475 A1* 11/2014 Divakaran ............. G06V 20/52
348/135

(Continued)

FOREIGN PATENT DOCUMENTS

JP 2014093023 A * 5/2014
JP 2016197345 A 11/2016
(Continued)

OTHER PUBLICATIONS

Gowsikhaa, D., et al. Suspicious Human Activity Detection from Surveillance Videos. International Journal on Internet & Distributed Computing Systems, vol. 2, No. 2, Jul. 2012, pp. 141-148. EBSCOhost, research.ebsco.com/linkprocessor/plink?id=4d9a3791-df82-36ea-82e0-573c9980bb45. (Year: 2012).*

*Primary Examiner* — Chan S Park
*Assistant Examiner* — Paulo Andres Garcia
(74) *Attorney, Agent, or Firm* — Canon U.S.A., Inc., IP Division

(57) ABSTRACT

An image processing apparatus includes at least one processor and at least one memory storing executable instructions which, when executed by the at least one processor, cause the image capturing apparatus to acquire an image of at least one person, detect at least one person in the acquired image, control processing for tracking the at least one detected person, and control processing for detecting an action of the at least one detected person based on a result of tracking the at least one detected person. The result of tracking the at least one detected person includes state information representing a tracking state of the at least one detected person. Whether to use the result of tracking the at least one detected person is based on a type of the action detection processing and the state information.

11 Claims, 11 Drawing Sheets

(51) Int. Cl.
  *G06V 10/26* (2022.01)
  *G06V 40/20* (2022.01)
(52) U.S. Cl.
  CPC .... *G06V 40/20* (2022.01); *G06T 2207/30201*
  (2013.01)
(58) Field of Classification Search
  CPC ................... G06V 20/52; G06T 7/246; G06T
  2207/30201; G06T 2207/30196; G06T
  2207/30232; G06T 2207/30241; Y02D
  10/00
  See application file for complete search history.

(56) References Cited

U.S. PATENT DOCUMENTS

| | | | | |
|---|---|---|---|---|
| 2018/0047181 A1 * | 2/2018 | Miyazaki | ............ | G06V 40/173 |
| 2019/0130582 A1 * | 5/2019 | Cheng | ....................... | G06T 7/11 |
| 2020/0043181 A1 * | 2/2020 | Kawai | ................... | G06V 20/41 |
| 2020/0134841 A1 * | 4/2020 | Toyoda | ............... | G06V 40/103 |
| 2020/0342211 A1 * | 10/2020 | Wang | ....................... | G06T 7/246 |
| 2022/0185625 A1 * | 6/2022 | One | ........................... | B66B 1/34 |
| 2022/0383518 A1 * | 12/2022 | Zhang | ................. | G06V 10/761 |
| 2023/0342950 A1 * | 10/2023 | Yoshinaga | ........... | G06V 40/103 |

FOREIGN PATENT DOCUMENTS

| | | | | | |
|---|---|---|---|---|---|
| JP | 2019197353 A | | 11/2019 | | |
| JP | 6620443 B2 | * | 12/2019 | | |
| WO | WO-2018008575 A1 | * | 1/2018 | ....... | G08B 13/19613 |

* cited by examiner

| TRACKING ID | TRACKING SUSPENSION INFORMATION | TRACKING RECTANGLE CENTER COORDINATE (x) | TRACKING RECTANGLE CENTER COORDINATE (y) | TRACKING RECTANGLE SIZE (WIDTH) | TRACKING RECTANGLE SIZE (HEIGHT) |
|---|---|---|---|---|---|
| 100 | NORMAL | 100 | 50 | 30 | 30 |
| 101 | NORMAL | 300 | 200 | 50 | 60 |
| 102 | SUSPENDED | 500 | 400 | 60 | 70 |
| 103 | SUSPENDED | 520 | 430 | 70 | 80 |
| | | . . . . | . . . . | | |

FIG.8

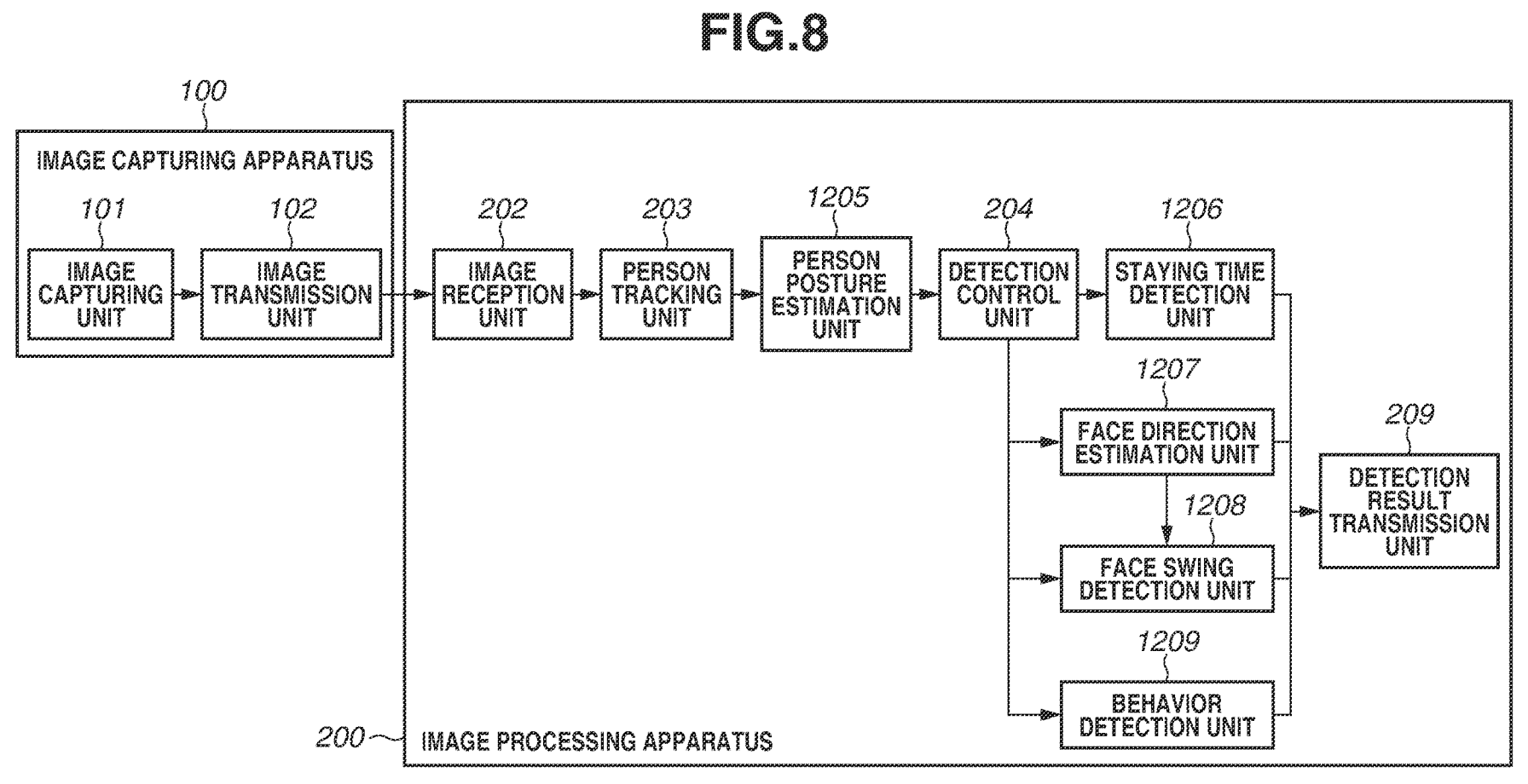

IMAGE CAPTURING APPARATUS — 100

IMAGE CAPTURING UNIT — 101

IMAGE TRANSMISSION UNIT — 102

IMAGE PROCESSING APPARATUS — 200

IMAGE RECEPTION UNIT — 202

PERSON TRACKING UNIT — 203

PERSON POSTURE ESTIMATION UNIT — 1205

DETECTION CONTROL UNIT — 204

STAYING TIME DETECTION UNIT — 1206

FACE DIRECTION ESTIMATION UNIT — 1207

FACE SWING DETECTION UNIT — 1208

BEHAVIOR DETECTION UNIT — 1209

DETECTION RESULT TRANSMISSION UNIT — 209

FIG.9

| TRACKING ID | NOSE COORDINATE (x) | NOSE COORDINATE (y) | NOSE DETECTION LIKELIHOOD | LEFT EYE COORDINATE (x) | ... |
|---|---|---|---|---|---|
| 100 | 115 | 55 | 0.7 | 120 | ... |
| 101 | 225 | 210 | 0.6 | 235 | ... |
| 102 | 530 | 420 | 0.4 | 545 | ... |
| 103 | 535 | 450 | 0.6 | 550 | ... |

IMAGE PROCESSING APPARATUS, IMAGE PROCESSING METHOD, AND STORAGE MEDIUM

BACKGROUND

Field

The present disclosure relates to a technique for analyzing an object in an image.

Description of the Related Art

As a method for analyzing actions and attributes of persons, there is a method of detecting persons from an image obtained by a monitoring camera, tracking the detected persons, and analyzing the action and attributes of each of the tracked persons. In a case where the persons overlap each other in the image, appropriate extraction of person features can fail, and thus the analysis is performed in consideration of the overlap between the persons. Japanese Patent Application Laid-Open No. 2016-197345 discusses a person search where a feature amount of a person is not updated in a case where the person mingles with other subjects. Japanese Patent Application Laid-Open No. 2019-197353 discusses estimation of attributes, such as the age and gender of a person, where an estimation score for the person is lowered while the person overlaps another person in an image.

In general, in a case where persons overlap each other in an image, the number of features of the covered person in the image decreases, and thus the accuracy of person detection and tracking declines. However, in action detection, it is desirable to continually track an action pattern of each person in an imaging range. Thus, if tracking results with lower detection and tracking accuracy due to an overlap between persons are all ignored, the amount of information to be used in the action detection decreases, and thus the probability of false detection and non-detection increases. If tracking results with lower detection and tracking accuracy due to an overlap between persons are all used, the accuracy of information to be used in the action detection decreases, and thus the probability of false detection due to, for example, swapping of tracked persons increases.

SUMMARY

The present disclosure is directed to improving detection accuracy in detecting an action of a person using a result of tracking the person in an image.

According to an aspect of the present disclosure, an image processing apparatus includes at least one processor, and at least one memory storing executable instructions which, when executed by the at least one processor, cause the image capturing apparatus to acquire an image of at least one person, detect at least one person in the acquired image, control processing for tracking the at least one detected person, and control processing for detecting an action of the at least one detected person based on a result of tracking the at least one detected person, wherein the result of tracking the at least one detected person includes state information representing a tracking state of the at least one detected person, and wherein whether to use the result of tracking the at least one detected person is based on a type of the action detection processing and the state information.

Further features of the present disclosure will become apparent from the following description of exemplary embodiments with reference to the attached drawings.

BRIEF DESCRIPTION OF THE DRAWINGS

FIG. 1 is a diagram illustrating a configuration of an image processing system according to a first exemplary embodiment.

FIG. 3 is a diagram illustrating an example of the tracking results according to the first exemplary embodiment.

FIG. 8 is a diagram illustrating a configuration of an image processing system according to a second exemplary embodiment.

FIG. 9 is a diagram illustrating an example of posture estimation results according to the second exemplary embodiment.

DESCRIPTION OF THE EMBODIMENTS

Figure 2A:
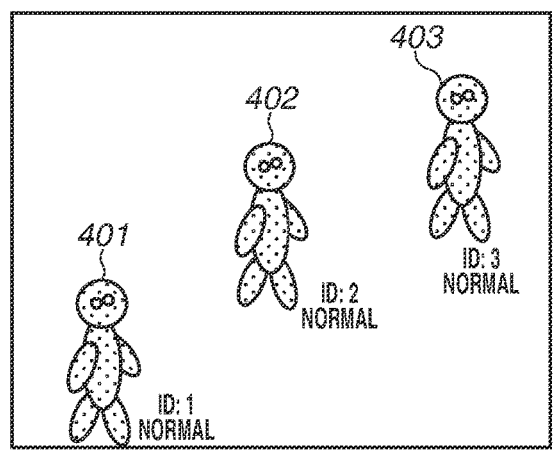
FIGS. 2A, 2B, 2C, and 2D are diagrams illustrating an example of tracking results according to the first exemplary embodiment.

Exemplary embodiments will be described below with reference to the attached drawings. Configurations described in the following exemplary embodiments are merely examples, and are not seen to be limiting.

In a first exemplary embodiment, a monitoring system will be described as an example of an image processing system. The monitoring system analyzes an image output from a camera installed in a retail store such as a convenience store, and transmits, upon detecting a suspicious action of a person in the image, the detected event to a different system. In the present exemplary embodiment, a case where an independent action is detected as a suspicious action of a person will be described.

Figure 1:
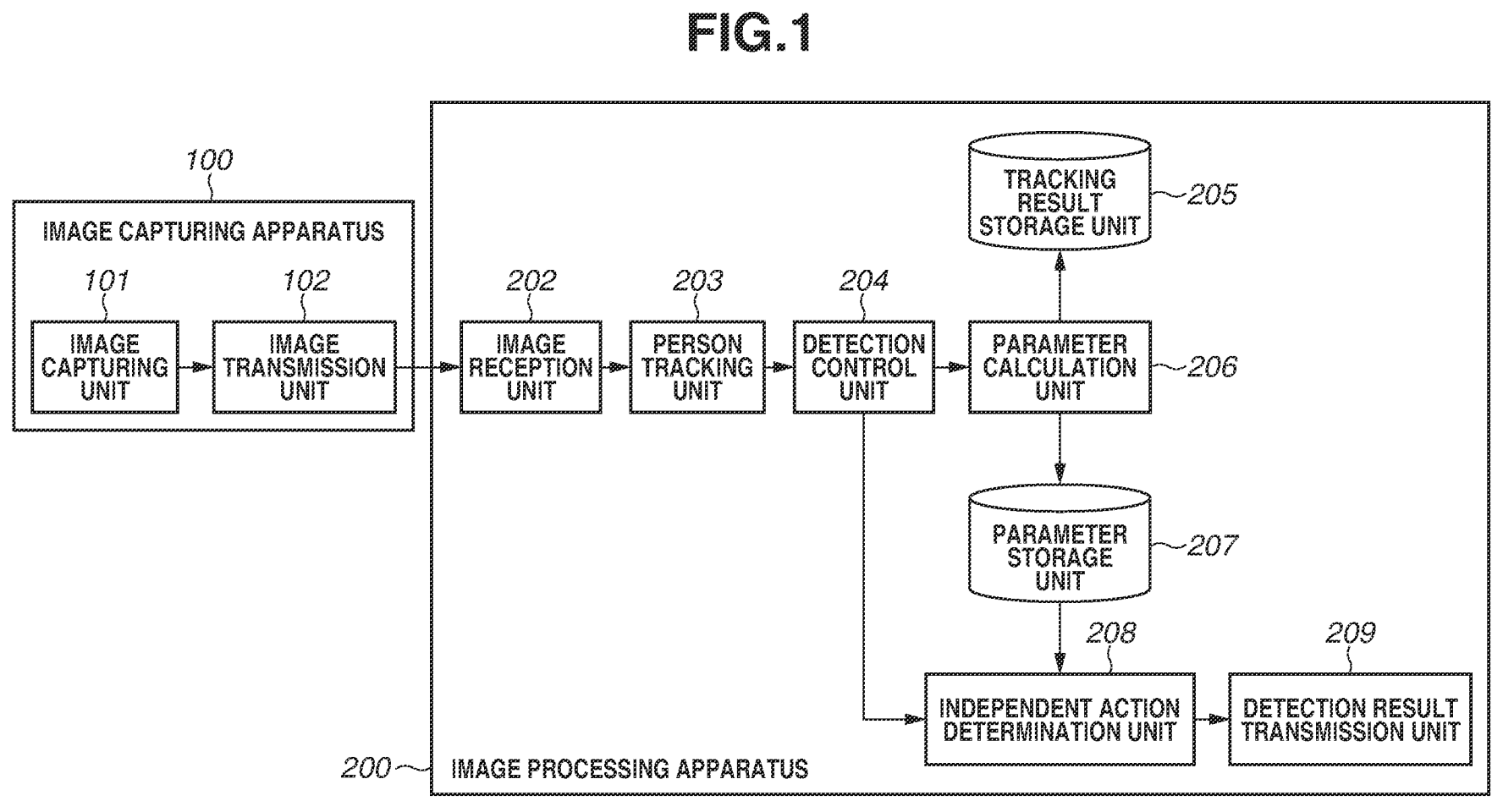

FIG. 1 is a diagram illustrating a configuration of the image processing system according to the first exemplary embodiment. The image processing system includes an image capturing apparatus 100 and an image processing apparatus 200. The image capturing apparatus 100 is a camera installed at a plurality of places in a retail store, and captures images of employees and customers. The image capturing apparatus 100 and the image processing apparatus 200 are connected to each other via a communication network. More specifically, the image capturing apparatus 100 and the image processing apparatus 200 are connected to each other via a computer network such as a wired local area network (LAN) or a wireless LAN.

The image capturing apparatus 100 includes an image capturing unit 101 and an image transmission unit 102. The image capturing unit 101 includes an imaging lens, an image sensor such as a charge-coupled device (CCD) sensor or a complementary metal-oxide semiconductor (CMOS) sensor, and a signal processing unit. Images captured by the image capturing unit 101 are transmitted to the image transmission unit 102 at predetermined time intervals. The image transmission unit 102 adds image capturing apparatus information and additional information such as time information to the images acquired from the image capturing unit 101, and converts the images into data that can be transmitted via the communication network. Subsequently, the image transmission unit 102 transmits the data to the image processing apparatus 200.

Next, a functional configuration of the image processing apparatus 200 will be described. The image processing apparatus 200 includes an image reception unit 202, a person tracking unit 203, a detection control unit 204, a tracking result storage unit 205, a parameter calculation unit 206, a parameter storage unit 207, an independent action determination unit 208, and a detection result transmission unit 209, as functional components.

The image reception unit 202 receives the data from the image capturing apparatus 100, and sequentially provides images from the received data to the person tracking unit 203.

The person tracking unit 203 detects persons in the images, and performs tracking processing of associating the detected persons between the images. First, the person tracking unit 203 detects the positions of the persons in the images using machine learning. The position of a person in an image is expressed by the center coordinates of a rectangle surrounding the person and the size (width and height) of the rectangle, using the upper left corner of the image as the point of origin. Next, the person tracking unit 203 associates the detected persons between the consecutive images.

More specifically, the persons detected from each of the frames are associated between the consecutive frames, using the length of a line segment connecting the center coordinates of the rectangles, the amount of change in the size of the rectangle, and a predicted position of the person obtained based on the past tracking processing. The person tracking unit 203 assigns a tracking identifier (ID) to each of the detected persons so that the same person can be identified in the consecutive images. The tracking ID is an identifier representing identity with a person detected in the past. A person already detected in a past frame is assigned the same tracking ID as that in the past frame. A person newly detected is assigned a new tracking ID. The person tracking unit 203 assigns tracking suspension information to each of the detected persons, together with the tracking ID. The tracking suspension information is state information representing a tracking state. In the present exemplary embodiment, the tracking suspension information is information indicating a suspended state or information indicating a normal state. In a case where the probability of a tracking ID being swapped with another one is a predetermined value or more, such as a case where persons overlap each other in an image, the tracking suspension information indicates the suspended state. In a case where the probability of a tracking ID being swapped with another one is less than the predetermined value, the tracking suspension information indicates the normal state. The suspended state occurs in a case where there is a plurality of candidate tracking IDs to be assigned to a detected person, i.e., in a case where there is a plurality of tracking IDs having tracking likelihood greater than or equal to a predetermined value. The tracking likelihood is a scalar value expressing the reliability of tracking, and the value range is from 0.0 to 1.0. Alternatively, the tracking suspension information can indicate the suspended state in a case where the degree of overlap between persons is a predetermined value or more.

The tracking processing will be described in detail with reference to FIGS. 2A to 2D.

FIG. 2A is a diagram illustrating tracking results in an image at a certain point in time. In FIG. 2A, three persons 401 to 403 are detected and the tracking processing is performed for each of the detected persons 401 to 403. The person 401 is assigned the tracking ID "1", the person 402 is assigned the tracking ID "2", and the person 403 is assigned the tracking ID "3". In addition, the three persons 401 to 403 are each assigned the tracking suspension information indicating the normal state.

Figure 2B:
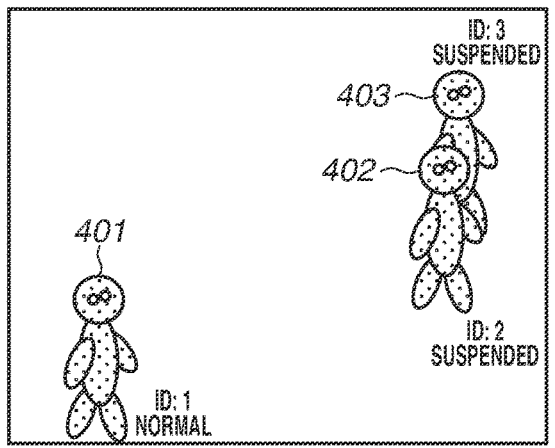
Figure 2C:
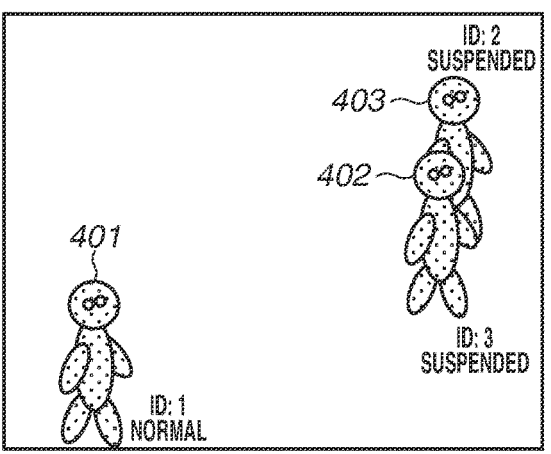
Figure 2D:
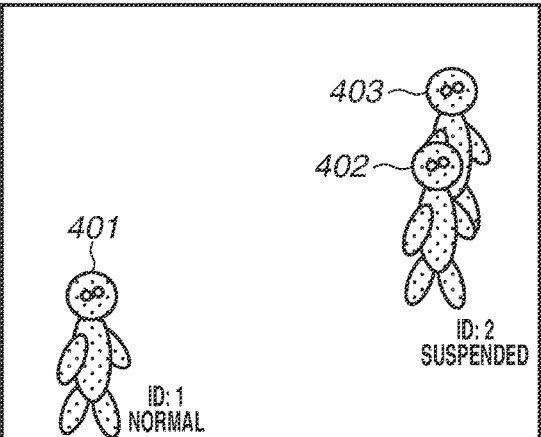

FIGS. 2B, 2C, and 2D are schematic diagrams illustrating tracking results in an image obtained after a lapse of a predetermined time from the point in time in FIG. 2A. In the image illustrated in FIGS. 2B, 2C, and 2D, a state occurs where the person 402 has moved rightward to overlap the person 403. Tracking result patterns that can occur in a case where persons overlap each other in an image will be described with reference to FIGS. 2B, 2C, and 2D.

FIG. 2B illustrates a case where the three persons 401 to 403 are detected, the person 401 is assigned the tracking ID "1", the person 402 is assigned the tracking ID "2", and the person 403 is assigned the tracking ID "3". In this case, the detected persons 401 to 403 are appropriately associated between the images. However, the persons 402 and 403 are each assigned the tracking suspension information indicating the suspended state. This is because the tracking likelihood of each of the tracking IDs "2" and "3" as candidate tracking IDs for the person 402 is a predetermined value or more. Similarly, this is because the tracking likelihood of each of the tracking IDs "3" and "2" as candidate tracking IDs for the person 403 is the predetermined value or more. In the following, a rectangle surrounding a person assigned a tracking ID will be referred to as a tracking rectangle.

FIG. 2C illustrates a case where the three persons 401 to 403 are detected, the person 401 is assigned the tracking ID "1", the person 402 is assigned the tracking ID "3", and the person 403 is assigned the tracking ID "2". In this case, the tracking ID of the person 403 and the tracking ID of the person 402 are swapped with each other. If the action of a person is detected directly using the tracking rectangle in this state, i.e., the state where the tracking ID is swapped with another one, information about another person is mixed with correct information, which results in noise. For example, in a series of tracking information about the tracking rectangle with the tracking ID "2", the tracking ID "2" is associated with the person 402 in FIG. 2A, and associated with the person 403 different from the person 402 in FIG. 2C.

The person 402 is actually moving rightward in the image. In this case, if time-series variation of the tracking information including the tracking results illustrated in FIG. 2C is used, the person 402 illustrated in FIG. 2A is falsely determined to be moving in a direction toward the person 403 illustrated in FIG. 2C, i.e., in a direction toward the upper right corner of the image. In addition, because of a difference in position, a difference in build, and a difference in clothes between the person 402 and the person 403, the size of the tracking rectangle changes differently from that in a case where the same person is tracked. Thus, false detection or non-detection can occur in action detection processing. However, in FIG. 2C, the tracking result of each of the persons 402 and 403 includes the tracking suspension information indicating that the tracking processing is suspended. In the present exemplary embodiment, the action detection processing is performed considering the suspended state, i.e., a high possibility of a tracking ID being swapped with another one. This can suppress false detection and non-detection.

FIG. 2D illustrates a case where the person 402 on the nearer side is detected, but the person 403 on the far side is not detected because of the influence of an overlap between the persons 402 and 403. In this case as well, the person 402 is assigned the tracking suspension information indicating the suspended state because the tracking likelihood of each of the tracking IDs "2" and "3" as candidate tracking IDs for the person 402 is the predetermined value or more.

Upon completion of the tracking processing, the person tracking unit 203 provides the images used as the processing targets and the tracking results in the images to the detection control unit 204. FIG. 3 illustrates an example of the tracking results. In the example of FIG. 3, the tracking result of each of the persons detected from the images is illustrated. As illustrated in FIG. 3, the tracking result is information including the tracking ID, the tracking rectangle center coordinates (x and y), the tracking rectangle size (width and height), and the tracking suspension information. The person tracking unit 203 sequentially performs the tracking processing on the images received from the image reception unit 202, and sequentially provides the obtained tracking results to the detection control unit 204.

The detection control unit 204 receives the tracking results from the person tracking unit 203, and controls a plurality of types of processing related to action detection. Depending on the type of the processing to be executed, the detection control unit 204 controls whether to use a list of tracking results including both tracking results indicating the normal state and a tracking result indicating the suspended state as the tracking suspension information, or create and use a list of tracking results including only tracking results indicating the normal state as the tracking suspension information.

More specifically, the list of tracking results including a tracking result indicating the suspended state is used for the processing not based on the time-series variation of the tracking rectangle, and the list of tracking results excluding a tracking result indicating the suspended state is used for the processing based on the time-series variation of the tracking rectangle.

In the present exemplary embodiment, as the processing related to action detection, there are two types of processing: parameter calculation processing to be executed by the parameter calculation unit 206 for independent action determination; and independent action determination processing to be executed by the independent action determination unit 208. The detection control unit 204 performs control to create and use a list of tracking results excluding a tracking result indicating the suspended state for the parameter calculation processing that is the processing based on the time-series variation of the tracking rectangle. The detection control unit 204 performs control to use a list of tracking results including a tracking result indicating the suspended state for the independent action determination processing that is the processing not based on the time-series variation of the tracking rectangle.

The parameter calculation unit 206 performs the parameter calculation processing for calculating parameters for position estimation (hereinafter referred to as position estimation parameters). The position estimation parameters are parameters for converting image coordinates into three-dimensional position information, and used in the independent action determination processing. First, the parameter calculation unit 206 creates a list of tracking results excluding a tracking result indicating the suspended state as the tracking suspension information. More specifically, the parameter calculation unit 206 sequentially stores the tracking results acquired from the detection control unit 204 and excluding a tracking result indicating the suspended state as the tracking suspension information into the tracking result storage unit 205. Time-series data including only the tracking results indicating the normal state as the tracking suspension information is thereby created and stored into the tracking result storage unit 205 as a list of tracking results. Next, the parameter calculation unit 206 reads out the past tracking results from the list of tracking results stored in the tracking result storage unit 205 and calculates the position estimation parameters using the read-out tracking results and the tracking results acquired this time. Subsequently, the calculated position estimation parameters are stored into the parameter storage unit 207.

The method for calculating the position estimation parameters will now be described. With respect to an object size in an image, a relation between position information on a detection plane (a virtual plane on which the center coordinates of an object as a detection target move) and the object size can be defined by the following equation (1):

$$W1 = a(x - xm) + b(y - ym) + wm \qquad (1)$$

In the equation (1), each sign expresses the following:
W1: Human body size
x, y: Tracking rectangle center coordinates
xm, ym: Average values of tracking rectangle center coordinates in read-out tracking results
wm: Average value of tracking rectangle sizes (widths) in read-out tracking results
a, b: Estimation parameters For the human body size W1, the tracking rectangle size (width) is used. The tracking rectangle size (height) can be used, but use of the tracking rectangle size (width) is more appropriate for stable calculation. This is because, in a vertical (y) direction of the image, moving a coordinate by one pixel affects a depth position more than in a lateral (x) direction, and thus a shift of the tracking rectangle has a greater influence. The estimation parameters "a" and "b" can be calculated from the acquired tracking rectangles using the least squares method. In the present exemplary embodiment, the parameter calculation unit 206 calculates the estimation parameters "a" and "b" using the tracking rectangles that have moved a predetermined distance or longer for a predetermined time without using all the tracking rectangles. This is intended to eliminate a tracking rectangle obtained as a result of false tracking on a painting or a flier in which a person is depicted, or the like, and to prevent coordinate bias of a tracking rectangle. In a case where a tracking ID is swapped with another one, false determination can occur in determining whether a tracking rectangle has moved the predetermined distance or longer for the predetermined time. In the present exemplary embodiment, because a tracking rectangle in the suspended state is excluded, the possibility of false determination is reduced. Thus, the accuracy of calculating the estimation parameters "a" and "b" can be improved. The parameter calculation unit 206 stores the values "a", "b", "xm", "ym", and "wm" calculated using the equation (1) described above into the parameter storage unit 207 as the position estimation parameters.

The independent action determination unit 208 performs the independent action determination processing on each person being tracked, based on the tracking results received from the detection control unit 204 and the position estimation parameters read out from the parameter storage unit 207. In a case where a detection target person is away from all the other persons by a predetermined threshold or more, or in a case where, even if there are persons close to the detection target person, a shield is present at a position shielding the detection target person against views from all the persons, the independent action determination unit 208 determines that the detection target person acts independently.

First, the independent action determination unit 208 converts the image coordinates of the tracking rectangle of each person into three-dimensional position information using the center coordinates "x" and "y" of the tracking rectangle and the read-out position estimation parameters. More specifically, the independent action determination unit 208 assigns the center coordinates "x" and "y" of the tracking rectangle and the read-out values "a", "b", "xm", "ym", and "wm" to the above-described equation (1), thereby determining W2 as an estimated human body size. In other words, W2 is expressed by "a(x–xm)+b(y–ym)+wm".

Next, the independent action determination unit 208 determines three-dimensional position information X, Y, Z, using the center coordinates "x" and "y" of the tracking rectangle, the estimated human body size W2, and the following equations (2) to (4):

$$Z = \text{focal} \times B / W2 \qquad (2)$$

$$X = Z \times (x - cx) / \text{focal} \qquad (3)$$

$$Y = Z \times (y - cy) / \text{focal} \qquad (4)$$

In the equations (2) to (4), each sign expresses the following.
X, Y, Z: Three-dimensional position information
W2: Estimated human body size
x, y: Center coordinates of tracking rectangle
B: Average human body size
focal: Camera focal length
cx, cy: Image center coordinates
An average value such as 0.43 m can be used as the average human body size B in a case where the tracking rectangle size (width) is assumed to be a shoulder width. As the focal, a value included in an extension area of the image can be used, or a value acquired as the image capturing apparatus information from the image capturing unit 101 can be used. As the imager center coordinates "cx" and "cy", the coordinates of the screen center obtained from the screen size of a display unit 415 (see FIG. 5) can be used.

Next, the independent action determination unit 208 creates pairs from all the persons after estimating the three-dimensional position of each of the persons being tracked. Subsequently, the independent action determination unit 208 calculates a distance between the persons in each of the pairs, using the following equation (5):

$$d = \sqrt{(X_i - X_j)^2 + (Y_i - Y_j)^2 + (Z_i - Z_j)^2} \qquad (5)$$

In the equation (5), each sign expresses the following:
d: Person-to-person distance
Xi, Yi, Zi: Three-dimensional position estimated for person i
Xj, Yj, Zj: Three-dimensional position estimated for person j
The person-to-person distance "d" is the Euclidean distance between the estimated three-dimensional positions of the persons "i" and "j".

The independent action determination unit 208 calculates a distance between the detection target person and each of the other persons by sequentially processing the persons being tracked, one by one, as the detection target person, and determines whether the distance between the persons is less than a predetermined threshold. In a case where there is no other person corresponding to the distance less than the predetermined threshold, this means that there is no person close to the detection target person, and thus the independent action determination unit 208 determines that the detection target person acts independently.

The independent action determination unit 208 estimates the position of a shield on the camera image beforehand. In a case where, even if there are persons close to the detection target person, a shield is present at a position shielding the detection target person against views from all the persons, the independent action determination unit 208 determines that the detection target person acts independently. The independent action determination unit 208 performs the independent action determination processing on each of the persons being tracked, as the detection target person, and provides results of the independent action determination processing to the detection result transmission unit 209.

The detection result transmission unit 209 receives the results of the independent action determination processing performed by the independent action determination unit 208, and transmits the received results to a transmission destination registered beforehand.

As described above, the parameter calculation processing and the independent action determination processing are different in terms of the use of a tracking result indicating the suspended state. In the parameter calculation processing, the position estimation parameters are calculated without using a tracking rectangle in the suspended state. In the independent action determination processing, tracking rectangles including a tracking rectangle in the suspended state are used. The reason why a tracking rectangle in the suspended state is used in the independent action determination processing will be described with reference to an example in FIGS. 4A and 4B.

Figures 4A, 4B:
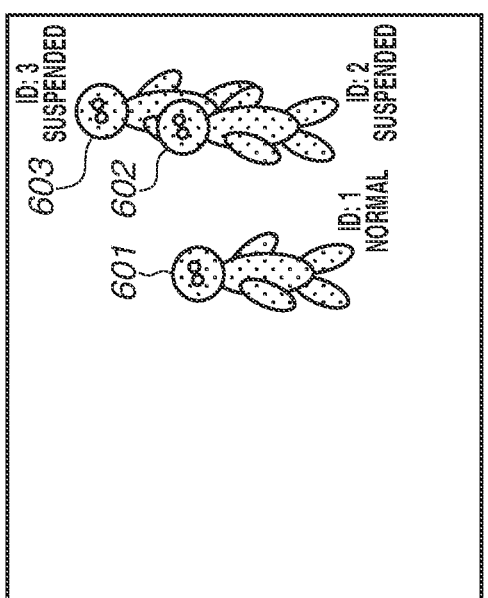
FIGS. 4A and 4B are diagrams illustrating independent action determination processing according to the first exemplary embodiment.

FIG. 4A is a diagram in which the tracking ID and the tracking suspension information are added to each person in an image at a certain point in time. A person 601 is assigned the tracking ID "1", a person 602 is assigned the tracking ID "2", and a person 603 is assigned the tracking ID "3". The tracking suspension information added to the person 601 indicates the normal state, whereas the tracking suspension information added to the person 602 and the person 603 indicates the suspended state because the person 602 and the person 603 overlap each other. The person 601 and the person 602 are close to each other, and the person 602 and the person 603 are close to each other. Thus, the three persons 601 to 603 do not act independently.

Suppose that, in such a state, the tracking rectangles in the suspended state are not used in the independent action determination processing, as illustrated in FIG. 4B. In this case, only the tracking rectangle surrounding the person 601 with the tracking ID "1" remains, and the tracking rectangles surrounding the other persons 602 and 603 are not used in the independent action determination processing on the tracking ID "1". Consequently, the independent action determination unit 208 determines that there is no person close to the position of the tracking ID "1", and falsely determines that the person 601 acts independently. In the present exemplary embodiment, such false determination can be avoided because the tracking rectangles in the suspended state are used in the independent action determination processing.

To determine whether there is a person close to the position of the tracking ID "1" when viewed from the position of the tracking ID "1", it does not matter whether a person close to the position of the tracking ID "1" has the tracking ID "2" or the tracking ID "3". The important thing is that a person is detected at a position close to the position of the tracking ID "1", regardless whether the tracking IDs "2" and "3" are swapped with each other.

Figure 5:
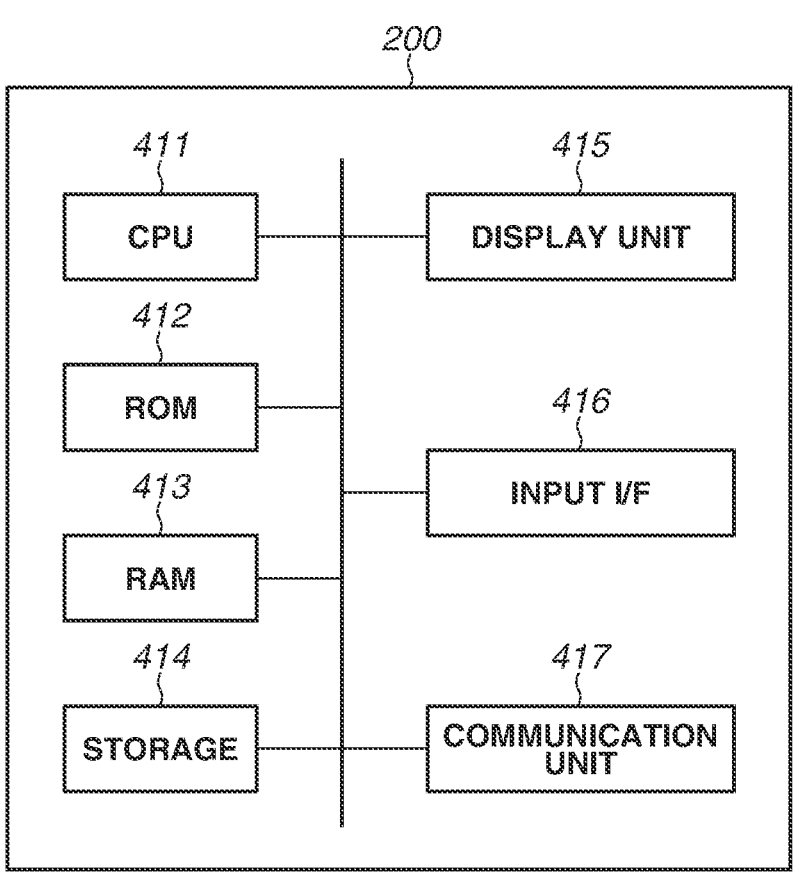
FIG. 5 is a diagram illustrating an example of a hardware configuration of an image processing apparatus according to the first exemplary embodiment.

Next, a hardware configuration of the image processing apparatus 200 will be described with reference to FIG. 5. The image processing apparatus 200 includes a central processing unit (CPU) 411, a read only memory (ROM) 412, a random access memory (RAM) 413, a storage 414, the display unit 415, an input interface (I/F) 416, and a communication unit 417. The CPU 411 reads out a control program stored in the ROM 412 and executes various types of processing based on the control program. The RAM 413 is used as a temporary storage area such as a main memory or a work area of the CPU 411. The storage 414 stores various types of data and various programs. The display unit 415 displays various kinds of information under the control by the CPU 411. The display unit 415 can be a display device integrated with a touch panel. The input I/F 416 is an interface for inputting operation information. The communication unit 417 performs processing for communication with an external apparatus, such as the image capturing apparatus 100, under the control by the CPU 411 via a wired or wireless communication network.

The functions of the image processing apparatus 200 and each processing in the flowchart illustrated in FIG. 7 as described below are implemented by the CPU 411 reading out a program stored in the ROM 412 or the storage 414 and executing the program. Alternatively, the CPU 411 can read out a program stored in a recording medium such as a Secure Digital (SD) card, in place of the ROM 412 or the storage 414. The ROM 412 or the storage 414 can provide a storage area for storing data stored by the tracking result storage unit 205 and the parameter storage unit 207 illustrated in FIG. 1.

Figure 7:
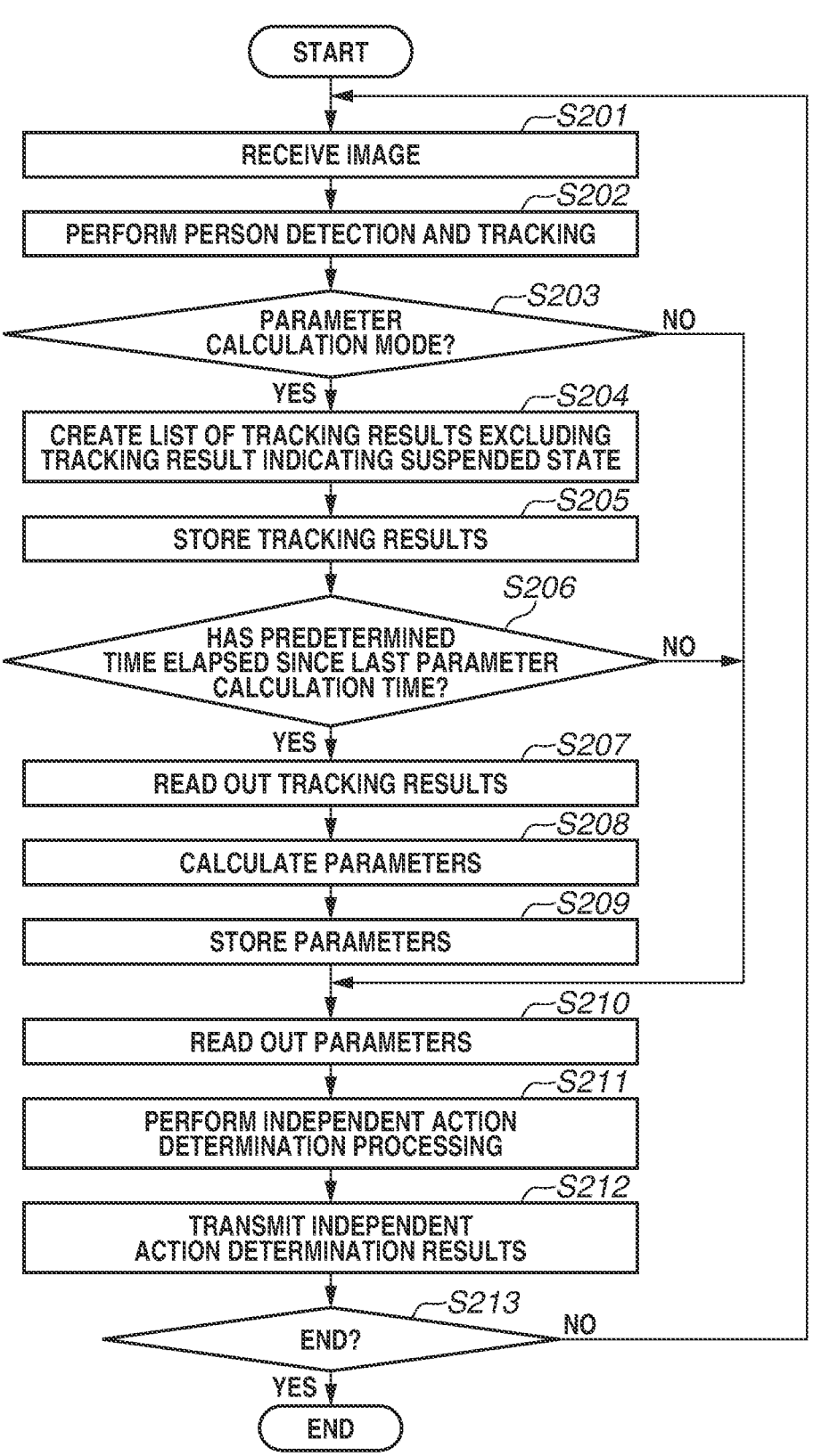
FIG. 7 is a flowchart illustrating processing by the image processing apparatus according to the first exemplary embodiment.

In the present exemplary embodiment, the image processing apparatus 200 executes each processing in the flowchart illustrated in FIG. 7, using one processor (the CPU 411) and one memory (the ROM 412), but any other configuration may be adopted. In another exemplary embodiment, for example, each processing in the flowchart illustrated in FIG. 7 can be executed by cooperation of a plurality of processors and a plurality of RAMs, ROMs, and storages. In still yet another exemplary embodiment, part of the processing can be executed using a hardware circuit.

In another exemplary embodiment, the functions of the image processing apparatus 200 and the processing to be described below can be implemented using a processor other than the CPU 411. For example, a graphics processing unit (GPU) can be used in place of the CPU 411.

Figure 6:
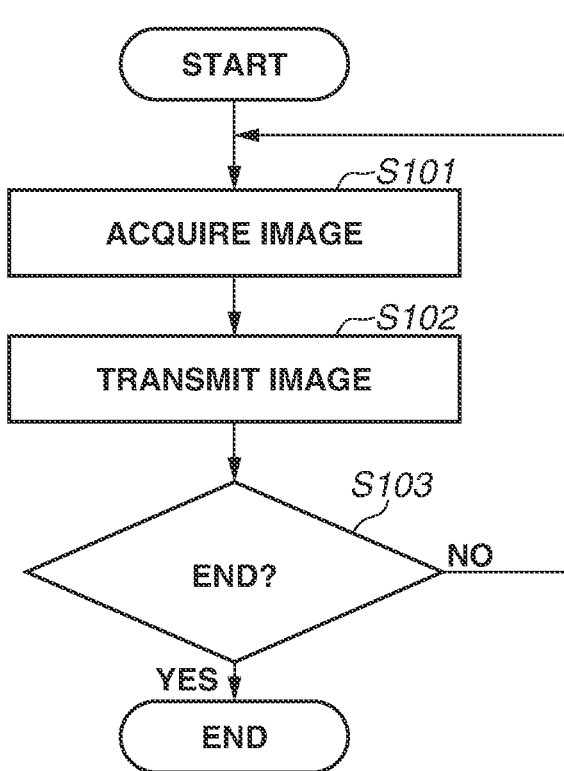
FIG. 6 is a flowchart illustrating processing by an image capturing apparatus according to the first exemplary embodiment.

Processing by the image capturing apparatus 100 according to the present exemplary embodiment will be described with reference to a flowchart in FIG. 6. The processing in this flowchart is implemented by a CPU (not illustrated) of the image capturing apparatus 100 executing a program stored in a storage device (not illustrated) of the image capturing apparatus 100. In the following description, the CPU of the image capturing apparatus 100 performs the processing in each step of the flowchart in FIG. 6.

In step S101, the image capturing apparatus 100 acquires an image using the image capturing unit 101.

In step S102, the image capturing apparatus 100 transmits the image acquired in step S101 to the image processing apparatus 200, using the image transmission unit 102.

In step S103, the image capturing apparatus 100 repeats the acquisition of an image (step S101) and the transmission of the image (step S102) at predetermined time intervals unless receiving a request to stop the transmission of the image (NO in step S103). In a case where the image capturing apparatus 100 receives a request to stop the transmission of the image (YES in step S103), the series of steps in the flowchart illustrated in FIG. 6 ends.

FIG. 7 is a flowchart illustrating the processing performed by the image processing apparatus 200 according to the present exemplary embodiment. The flowchart is started when the image processing apparatus 200 starts receiving an image from the image capturing apparatus 100.

First, in step S201, the image reception unit 202 receives an image from the image capturing apparatus 100.

In step S202, the person tracking unit 203 detects persons in the image received in step S201 and performs the tracking processing on the detected persons to generate tracking results representing results of the tracking processing.

In step S203, the detection control unit 204 determines whether a parameter calculation mode is set. In a case where the detection control unit 204 determines that the parameter calculation mode is set (YES in step S203), the processing proceeds to step S204. In a case where the detection control unit 204 determines that the parameter calculation mode is not set (NO in step S203), the processing proceeds to step S210.

In step S204, the parameter calculation unit 206 excludes a tracking result indicating the suspended state as the tracking suspension information from the tracking results generated in step S202.

In step S205, the parameter calculation unit 206 stores the tracking results not excluded in step S204 in the tracking result storage unit 205. The tracking results are accumulated on a time-series basis.

In step S206, the parameter calculation unit 206 determines whether a predetermined time has elapsed since the last parameter calculation time. In a case where the parameter calculation unit 206 determines that the predetermined time has elapsed since the last parameter calculation time (YES in step S206), the processing proceeds to step S207. In a case where the predetermined time has not elapsed (NO in step S206), the processing proceeds to step S210.

In step S207, the parameter calculation unit 206 reads out, from the tracking result storage unit 205, the past tracking results including the tracking results generated in step S202.

In step S208, the parameter calculation unit 206 calculates the position estimation parameters using the tracking results read out in step S207. To calculate the position estimation parameters, the tracking rectangles that have moved the predetermined distance or longer for the predetermined time in the read-out tracking results are used, where the list of tracking results excluding a tracking result indicating the suspended state is used. Thus, mixing-in of a tracking rectangle surrounding another person is prevented, which results in suppression of noise generation.

In step S209, the parameter calculation unit 206 stores the position estimation parameters calculated in step S208 and the parameter calculation time (the current time) in the parameter storage unit 207.

In step S210, the independent action determination unit 208 reads out the position estimation parameters from the parameter storage unit 207.

In step S211, using the read-out position estimation parameters and the tracking results generated in step S202, the independent action determination unit 208 performs the independent action determination processing on each person in the tracking results. More specifically, the independent action determination unit 208 estimates person-to-person distances for each person, and determines that the person acts independently in a case where there are no other persons corresponding to the person-to-person distance less than the predetermined threshold. The list of tracking results including a tracking result indicating the suspended state as the tracking suspension information is used, so that information indicating whether a person is at a position close to another person can be used. As a result, a risk of a person being falsely determined to act independently despite the presence of another person close to the person can be reduced.

In step S212, the detection result transmission unit 209 transmits results of the independent action determination processing in step S211 to a predetermined transmission destination.

In step S213, the image processing apparatus 200 repeats the processing in steps S201 to S212 unless receiving a request to stop the reception of an image (NO in step S213). In a case where the image processing apparatus 200 receives a request to stop the reception of an image (YES in step S213), the series of steps in the flowchart illustrated in FIG. 7 ends.

According to the above-described processing of the flowchart illustrated in FIG. 7, in the independent action determination processing, the position estimation parameters calculated without using a tracking result indicating the suspended state are used when person-to-person distances are estimated from the positions of a plurality of persons being tracked. Therefore, the accuracy of the independent action determinations increases.

As described above, according to the present exemplary embodiment, it is possible, for the action detection processing, to switch between use and non-use of a tracking result in which there is a possibility that a person being tracked can be swapped with another person due to the influence of an overlap between the persons. This enables using the tracking results excluding a tracking result indicating the suspended state in the case of the processing based on the time-series variation of the tracking information, and using the tracking results including a tracking result indicating the suspended state in the case of the processing not based on the time-series variation of the tracking information. Therefore, the tracking results can be used for the action detection processing without overs and shorts, so that the probability of false detection and non-detection in the action detection processing can be reduced.

In the first exemplary embodiment, the case where the image processing apparatus 200 detects an independent action has been described. In a second exemplary embodiment, a case where any suspicious action other than the independent action is detected will be described. For description purposes, just differences from the first exemplary embodiment will mainly be described.

FIG. 8 is a diagram illustrating a configuration of an image processing system according to the second exemplary embodiment. There are two main differences between FIG. 8 and FIG. 1. The first difference is that a person posture estimation unit 1205 is added between the person tracking unit 203 and the detection control unit 204 in FIG. 8. The second difference is that the tracking result storage unit 205, the parameter calculation unit 206, the parameter storage unit 207, and the independent action determination unit 208 are not included in the image processing apparatus 200 in FIG. 8 because processing to be controlled by the detection control unit 204 is different from that in the first exemplary embodiment. In their place, the image processing apparatus 200 according to the present exemplary embodiment includes a staying time detection unit 1206, a face direction estimation unit 1207, a face swing detection unit 1208, and a behavior detection unit 1209. These components are action detection units that detect different actions. In the present exemplary embodiment, the face swing detection unit 1208 and the behavior detection unit 1209 have the function as that of the tracking result storage unit 205.

The person posture estimation unit 1205 will now be described. Based on the tracking results obtained by the person tracking unit 203, the person posture estimation unit 1205 detects, from an image of the entire body of each person being tracked, the positions of key points of the person in the image using machine learning, and outputs the coordinates and likelihood of the detected positions as posture estimation results. The key points of the person are components of the person such as main organ points and/or joints, and include, for example, eyes, ears, a nose, shoulders, hips, elbows, wrists, knees, and ankles. Upon completing the posture estimation processing, the person posture estimation unit 1205 provides the tracking results and the posture estimation results to the detection control unit 204. FIG. 9 illustrates an example of the posture estimation results. As illustrated in FIG. 9, the posture estimation results are information including the tracking IDs, the coordinates of each organ point and/or each joint, and detection likelihood thereof.

Next, the staying time detection unit 1206, the face direction estimation unit 1207, the face swing detection unit 1208, and the behavior detection unit 1209 will be described. The detection control unit 204 provides the list of tracking results and the list of posture estimation results to each of these components, and controls the action detection processing performed by each of them. The detection control unit 204 performs control to, for the detection processing not based on time-series variation, use the list of tracking results including both tracking results indicating the normal state and tracking results indicating the suspended state as the tracking suspension information. In other words, the control is performed to directly use the list of tracking results received from the person posture estimation unit 1205. The detection control unit 204 performs control to, for the detection processing based on time-series variation, create and use a list of tracking results including only tracking results indicating the normal state as the tracking suspension information.

The staying time detection unit 1206 performs staying time detection processing. The staying time detection processing measures a time during which each person being tracked stays in an imaging range of the image capturing unit 101. The staying time detection processing is not based on time-series variation. The staying time detection unit 1206 calculates the current staying time using the list of tracking results received from the detection control unit 204 and a list of staying times calculated in the past and stored in the staying time detection unit 1206.

The staying time detection processing will be specifically described with reference to FIGS. 10A to 10C.

Figure 10A:
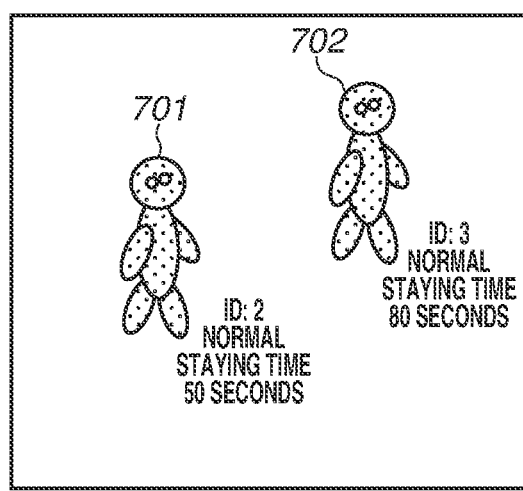
FIGS. 10A, 10B, and 10C are diagrams illustrating staying time detection according to the second exemplary embodiment.

FIG. 10A is a diagram in which the tracking ID, the tracking suspension information, and the staying time are added to each person in an image at a certain point in time. At the point in time in FIG. 10A, a person 701 is assigned the tracking ID "2" and the staying time is counted as 50 seconds. A person 702 is assigned the tracking ID "3" and the staying time is counted as 80 seconds.

Figure 10B:
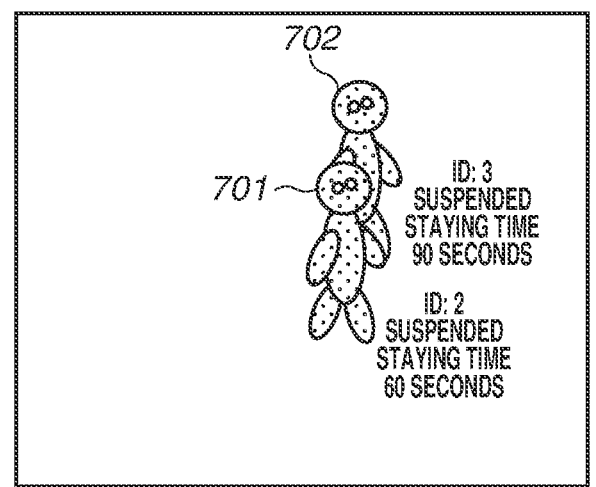
Figure 10C:
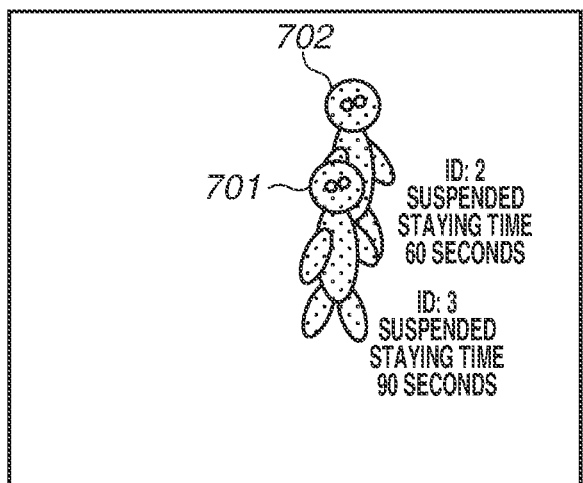

An image illustrated in FIGS. 10B and 10C is obtained after a lapse of ten seconds from the point in time in FIG. 10A. In the image of FIG. 10B, the tracking IDs similar to those in FIG. 10A are assigned to the persons 701 and 702, the suspended state is indicated for both of the persons 701 and 702 because of the influence of an overlap between the persons 701 and 702, and ten seconds are added to the staying time for both of the persons 701 and 702.

In the image of FIG. 10C, the tracking IDs of the persons 701 and 702 are swapped with each other. However, FIG. 10C is similar to FIG. 10B in that the staying time is counted as 60 seconds for the tracking ID "2", and the staying time is counted as 90 seconds for the tracking ID "3". Thus, even in a case where the tracking IDs are swapped with each other as in FIG. 10C, the staying time can be counted in a manner similar to that in FIG. 10B in which the tracking IDs are not swapped with each other, if the overlap between the persons 701 and 702 disappears later and the persons 701 and 702 return to the state before the swapping of the tracking IDs. For such a reason, the tracking results indicating the suspended state are used in the staying time detection processing. The staying time detection unit 1206 provides the staying time detected for each person being tracked to the detection result transmission unit 209.

The face direction estimation unit 1207 performs processing for estimating a face direction of each person in an image. The face direction estimation processing is not based on time-series variation. The face direction estimation unit 1207 estimates the face direction of each person using the list of tracking results and the list of posture estimation results received from the detection control unit 204. More specifically, based on the positional relationship between the coordinates of the face organs among the key point coordinates included in the posture estimation results, the face direction estimation unit 1207 estimates a degree at which the face of the person is directed with respect to each of three axes of: up and down; side to side; and rotation within the screen. The face direction estimation unit 1207 provides the face direction estimation result of each person being tracked to the face swing detection unit 1208 and the detection result transmission unit 209.

The face swing detection unit 1208 performs processing for detecting a surroundings check action on each person in an image. This processing is face swing detection processing based on time-series variation. The face swing detection unit 1208 creates a list of tracking results excluding a tracking result indicating the suspended state. The method for creating the list is similar to that in the first exemplary embodiment. The face swing detection unit 1208 then detects the surroundings check action of the person based on the created list of tracking results, the face direction estimation results received from the face direction estimation unit 1207, and the past processing results stored in the face swing detection unit 1208. More specifically, among the face direction estimation results received from the face direction estimation unit 1207, only the data corresponding to the created list of tracking results is used. The surroundings check action to be detected is a face swing action of a detection target person that is performed to check whether there is a person around the detection target person and to check the position of a person around the detection target person. In a method for determining whether the surroundings check action is performed, at first, the face direction is predicted from a change in face direction of the person, and a difference in value between the predicted face direction and the face direction included in the face direction estimation results is calculated. Subsequently, in a case where the sum of the differences in a predetermined time is a predetermined amount or more, the change in face direction is regarded as being large, and the surroundings check action is determined to be performed. In a case where the sum is less than the predetermined amount, the surroundings check action is determined not to be performed. The face swing detection unit 1208 calculates the difference in value between the face direction included in the face direction estimation results and the predicted face direction for each person, and determines whether the surroundings check action is performed based the calculated difference. The face swing detection unit 1208 provides the surroundings check action determination result of each person being tracked to the detection result transmission unit 209.

The behavior detection unit 1209 performs processing for detecting the behavior of each person in an image. The behavior detection processing is based on time-series variation. The behavior detection unit 1209 creates a list of tracking results excluding a tracking result indicating the suspended state. The method for creating the list is similar to that in the first exemplary embodiment. The behavior detection unit 1209 then detects the behavior of each person based on the created list of tracking results, the posture estimation results, and the past processing results stored in the behavior detection unit 1209. More specifically, among the posture estimation results received from the detection control unit 204, only the data corresponding to the created list of tracking results is used. The behavior to be detected is, for example, extension of a hand by a person, squatting down, or the like. The behavior detection unit 1209 acquires the key point coordinates of each person from the past posture estimation results and the current posture estimation results, and detects the behavior of each person based on the time-series variation of the acquired key point coordinates by using machine learning. The behavior detection unit 1209 provides the behavior detection result of each person being tracked to the detection result transmission unit 209.

Figure 11:
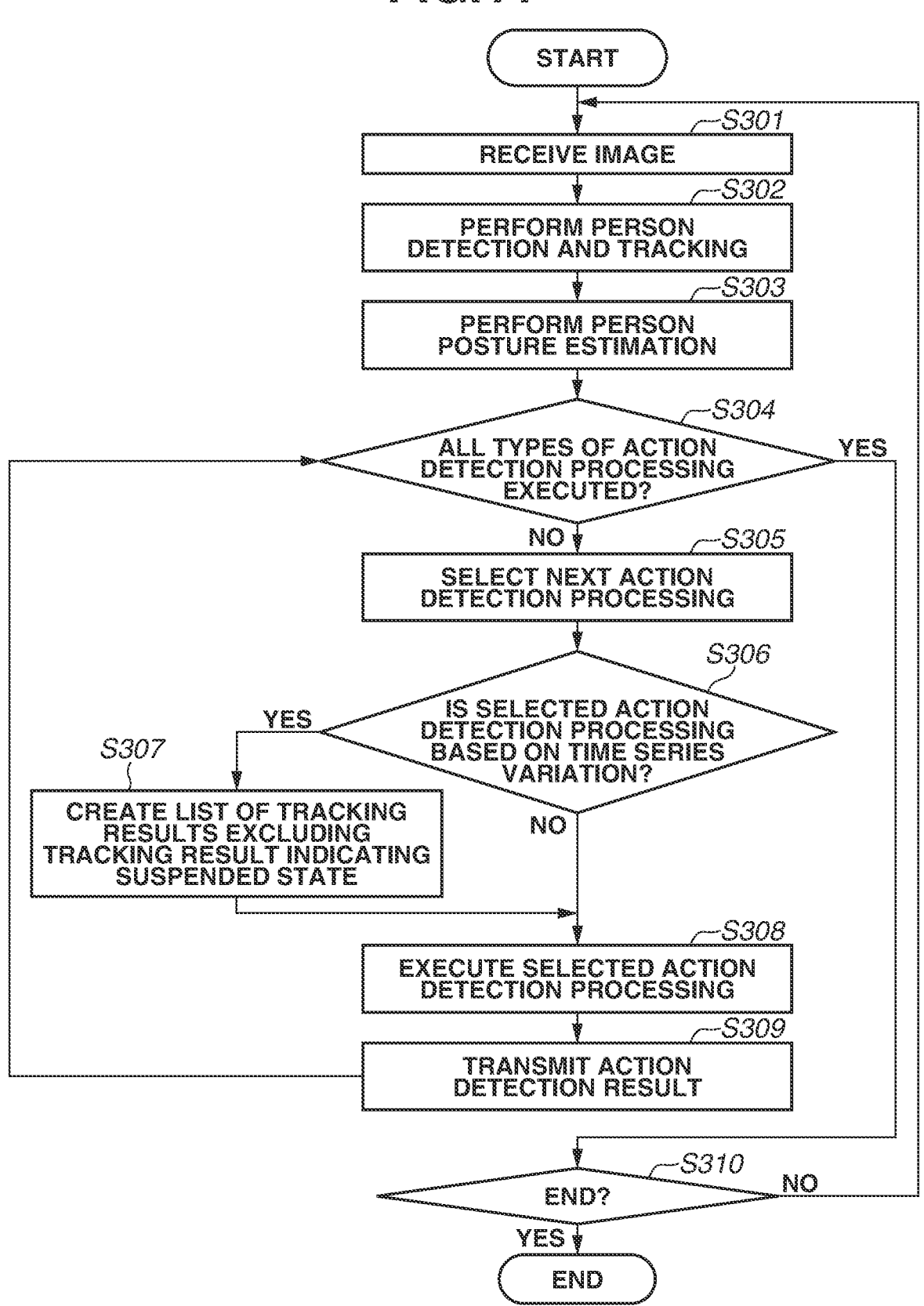
FIG. 11 is a flowchart illustrating processing by an image processing apparatus according to the second exemplary embodiment.

FIG. 11 is a flowchart illustrating processing performed by the image processing apparatus 200 according to the present exemplary embodiment.

Step S301 and step S302 are similar to step S201 and step S202 in FIG. 7, respectively and thus the description thereof is omitted. After step S302, the processing proceeds to step S303. In step S303, the person posture estimation unit 1205 performs the person posture estimation processing using the image received in step S301 and the tracking results obtained in step S302.

In step S304, the detection control unit 204 determines whether all types of the action detection processing have been executed. In a case where the detection control unit 204 determines that all types of the action detection processing have been executed (YES in step S304), the processing proceeds to step S310. In a case where the detection control unit 204 determines that all types of the action detection processing have not been executed (NO in step S304), the processing proceeds to step S305.

In step S305, the detection control unit 204 selects the next action detection processing as an execution target.

In step S306, the detection control unit 204 determines whether the action detection processing selected in step S305 is based on time-series variation. In a case where the detection control unit 204 determines that the selected action detection processing is based on time-series variation (YES in step S306), the processing proceeds to step S307. In a case where the detection control unit 204 determines that the selected action detection processing is not based on time-series variation (NO in step S306), the processing proceeds to step S308. In the present exemplary embodiment, in a case where the processing to be executed by either the face swing detection unit 1208 or the behavior detection unit 1209 is selected, the processing proceeds to step S307. In a case where the processing to be executed by either the staying time detection unit 1206 or the face direction estimation unit 1207 is selected, the processing proceeds to step S308.

In step S307, the action detection unit (either the face swing detection unit 1208 or the behavior detection unit 1209) corresponding to the selected action detection processing creates a list of tracking results excluding a tracking result indicating the suspended state.

In step S308, the action detection unit (the staying time detection unit 1206, the face direction estimation unit 1207, the face swing detection unit 1208, or the behavior detection unit 1209) corresponding to the selected action detection processing executes the action detection processing.

In step S309, the detection result transmission unit 209 transmits results of the action detection processing to a predetermined transmission destination. The processing then returns to step S304.

In step S310, the image processing apparatus 200 repeats the processing in step S301 to step S309 unless receiving a request to stop the reception of an image (NO in step S310). In a case where the image processing apparatus 200 receives a request to stop the reception of an image (YES in step S310), the series of steps in the flowchart illustrated in FIG. 11 ends.

As described above, according to the present exemplary embodiment, it is possible, for the action detection processing, to switch between use and non-use of a tracking result in which there is a possibility that a person being tracked can be swapped with another person due to the influence of an overlap between the persons. This makes it possible to use tracking rectangle information and posture estimation information that exclude information corresponding to the suspended state in the case of the action detection processing based on time-series variation, and to use tracking rectangle information and posture estimation information that include information corresponding to the suspended state in the case of the action detection processing not based on time-series variation. Therefore, the tracking results can be used for the action detection processing without overs and shorts, so that the probability of false detection and non-detection in the action detection processing can be reduced.

While the exemplary embodiments of the present disclosure have been described in detail above, each of the exemplary embodiments can take the form of, for example, a system, an apparatus, a method, a program, or a recording medium (a storage medium). More specifically, the exemplary embodiments of the present disclosure can be applied to a system including a plurality of apparatuses (e.g., a host computer, an interface device, an image capturing apparatus, and a web application), or can be applied to an apparatus including one device.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-002499, filed Jan. 11, 2022, which is hereby incorporated by reference herein in its entirety.

What is claimed is:

1. An image processing apparatus comprising:
at least one processor; and
at least one memory storing executable instructions which, when executed by the at least one processor, cause the image processing apparatus to:
acquire an image of at least one person;
detect at least one person in the acquired image;
control processing for tracking the at least one detected person;
control processing for detecting an action of the at least one detected person based on a result of tracking the at least one detected person, and
control processing for estimating position information about a component of the at least one detected person,
wherein the result of tracking the at least one detected person includes state information representing a tracking state of the at least one detected person,
wherein whether to use the result of tracking the at least one detected person is based on a type of the action detection processing and the state information,
wherein the state information is updated to indicate a suspended state in a case where, among tracking likelihoods calculated for associating the at least one detected person with each of a plurality of previously detected persons, two or more of the tracking likelihoods are greater than or equal to a predetermined likelihood threshold,
wherein, in a case where the type of the action detection processing is a type not based on time-series variation, the result of tracking the at least one detected person indicating the suspended state is used in executing the action detection processing, and in a case where the type of the action detection processing is a type based on time-series variation, the result of tracking the at least one detected person indicating the suspended state is not used in executing the action detection processing, and wherein the action detection processing of the type based on time-series variation includes detecting a behavior of the at least one detected person based on time-series variation of the position information about the component and detecting a surroundings check action of the at least one detected person based on a difference between a direction of the at least one detected person's face and a value predicted from the face direction.

2. The image processing apparatus according to claim 1, wherein a first list that contains every result of tracking the at least one detected person, and a second list which is generated by removing, from the first list, each result of tracking that includes the state information indicating the suspended state, are generated, and the first list is supplied to the action detection processing of a type that is not based on time-series variation, and the second list is supplied to the action detection processing of a type that is based on time-series variation.

3. The image processing apparatus according to claim 1, wherein the image is acquired on a time-series basis, wherein the result of tracking the at least one detected person is generated based on a time-series basis, and wherein time-series data is created based on a time-series data excluding the result of tracking the at least one detected person indicating the suspended state in a case where the type of the action detection processing is the type based on time-series variation.

4. The image processing apparatus according to claim 1, wherein the action detection processing of the type based on time-series variation includes calculating a parameter for estimating position information about the at least one detected person based on a position and a size of a rectangle surrounding the at least one detected person.

5. The image processing apparatus according to claim 4, wherein the action detection processing of the type not based on time-series variation includes calculating a person-to-person distance based on the position information about the at least one detected person estimated based on the calculated parameter and the position and the size of the rectangle surrounding the at least one detected person.

6. The image processing apparatus according to claim 1, wherein the action detection processing of the type not based on time-series variation includes measuring a time during which the at least one detected person remains in an imaging range.

7. The image processing apparatus according to claim 1, wherein the action detection processing of the type not based on time-series variation includes estimating a direction of the at least one detected person's face.

8. The image processing apparatus according to claim 1, wherein the state information is updated to indicate a suspended state in a case where a degree of an overlap between the at least one detected person and another person in the acquired image is a predetermined value or more.

9. The image processing apparatus according to claim 1, wherein the at least one detected person is assigned an identifier representing identity with a previously detected person and the state information is updated to indicate a suspended state in a case where a probability of the identifier being assigned to another person is a predetermined value or more.

10. An image processing method comprising:
acquiring an image of at least one person;
detecting at least one person in the acquired image;
controlling processing for tracking the at least one detected person;
controlling processing for detecting an action of the at least one detected person based on a result of tracking the at least one detected person, and
controlling processing for estimating position information about a component of the at least one detected person,
wherein the result of tracking the at least one detected person includes state information representing a tracking state of the at least one detected person,
wherein whether to use the result of tracking the at least one detected person is based on a type of the action detection processing and the state information,
wherein the state information is updated to indicate a suspended state in a case where, among tracking likelihoods calculated for associating the at least one detected person with each of a plurality of previously detected persons, two or more of the tracking likelihoods are greater than or equal to a predetermined likelihood threshold,
wherein, in a case where the type of the action detection processing is a type not based on time-series variation, the result of tracking the at least one detected person indicating the suspended state is used in executing the action detection processing, and in a case where the type of the action detection processing is a type based on time-series variation, the result of tracking the at least one detected person indicating the suspended state is not used in executing the action detection processing, and
wherein the action detection processing of the type based on time-series variation includes detecting a behavior of the at least one detected person based on time-series variation of the position information about the component and detecting a surroundings check action of the at least one detected person based on a difference between a direction of the at least one detected person's face and a value predicted from the face direction.

11. A non-transitory computer-readable storage medium storing a program for causing a computer to execute an image processing method, the image processing method comprising:
acquiring an image of at least one person;
detecting at least one person in the acquired image;
controlling processing for tracking the at least one detected person;
controlling processing for detecting an action of the at least one detected person based on a result of tracking the at least one detected person, and
controlling processing for estimating position information about a component of the at least one detected person,
wherein the result of tracking the at least one detected person includes state information representing a tracking state of the at least one detected person,
wherein whether to use the result of tracking the at least one detected person is based on a type of the action detection processing and the state information,
wherein the state information is updated to indicate a suspended state in a case where, among tracking likelihoods calculated for associating the at least one detected person with each of a plurality of previously detected persons, two or more of the tracking likeli-
hoods are greater than or equal to a predetermined
likelihood threshold,
wherein, in a case where the type of the action detection
processing is a type not based on time-series variation,
the result of tracking the at least one detected person
indicating the suspended state is used in executing the
action detection processing, and in a case where the
type of the action detection processing is a type based
on time-series variation, the result of tracking the at
least one detected person indicating the suspended state
is not used in executing the action detection processing,
and
wherein the action detection processing of the type based
on time-series variation includes detecting a behavior
of the at least one detected person based on time-series
variation of the position information about the compo-
nent and detecting a surroundings check action of the at
least one detected person based on a difference between
a direction of the at least one detected person's face and
a value predicted from the face direction.

\*   \*   \*   \*   \*